Dec. 1, 1970 M. ALDEN 3,545,004

CARTRIDGE FOR FACSIMILE RECORDING WEBS

Filed Nov. 26, 1968 2 Sheets-Sheet 1

Inventor
Milton Alden
by Roberts, Cushman & Grover
Att'ys

CARTRIDGE FOR FACSIMILE RECORDING WEBS

Filed Nov. 26, 1968 2 Sheets-Sheet 2

United States Patent Office 3,545,004
Patented Dec. 1, 1970

3,545,004

CARTRIDGE FOR FACSIMILE RECORDING WEBS

Milton Alden, Wellesley, Mass. (% Alden Research Foundation, Washington St., Westboro, Mass. 01581)

Filed Nov. 26, 1968, Ser. No. 779,181
Int. Cl. G01d *15/06, 15/28*
U.S. Cl. 346—74 17 Claims

ABSTRACT OF THE DISCLOSURE

A facsimile recorder comprises a housing enclosing blade and helical electrodes for marking moist electrolytic paper and a drive for feeding the paper. A roll of the paper is enclosed in a throw-away cartridge detachably mounted in the housing. The cartridge has a linear slit through which the blade enters to one side of the paper, an opposed linear slit through which the helix scans the paper line by line, and an exit for the paper. Adhesive tape temporarily seals the slits and exit to retain the paper moisture. Feed rolls engage the paper between the slits and exit. A heater just beyond the slits dries the paper. The electrodes, heater and feed rolls are mounted either on the housing or on the cartridges. Alternatively photosensitive paper may be scanned line by line through a linear slit and the resulting latent record developed and fixed on the path to the cartridge exit.

In facsimile recording apparatus a sensitive web or strip of recording paper or the like is fed past marking means which scan the web line by line and on it mark an instantly visible or developable image on successive lines transversely of the direction of feed of the web in response to a series of electric signals. In the case of electrolytic, electrostatic or thermally sensitive papers an electrical current is applied to the paper by electrodes which deteriorate in normal operation and which are subject to becoming fouled by particles from the paper. After marking, and further treatment if necessary, the web is fed from the apparatus marked with a permanent record requiring no further treatment.

In prior apparatus the recording paper is supplied in a roll which is first manually mounted in the apparatus and then threaded past the various marking and treating stages in proper alignment. In the case of moist electrolytic or of photosensitive paper, this exposes the paper to environmental deterioration in addition to the handling described. In the case of optically scanned papers requiring chemical development the chemicals require replenishment and are subject to evaporation or contamination.

Objects of the present invention are to provide a way of easy replacement of a paper supply in facsimile scanning apparatus, which is also adapted for replacement of deteriorated marking or treating stages for the paper.

According to the invention there is provided a cartridge for use in recording apparatus having means for feeding an elongate recording web lengthwise and means on a frame for marking the web line by line with a record by scanning transversely thereof, said marking means including means to render the record visible, said cartridge comprising a housing forming a chamber for holding a supply of said web, wall means forming an enclosing path for the web from said chamber, an aperture through said wall means to said path disposed transversely of the path, and a web exit beyond said aperture, and means for separably attaching the cartridge to said frame with said marking means operative on the web through said aperture, and with said feeding means engaging the web beyond the aperture to feed the web past the marking means at said aperture and the visibly marked web through said exit out of the cartridge.

For the purpose of illustration certain embodiments of the invention are illustrated in the accompanying drawings in which.

Figure 1:
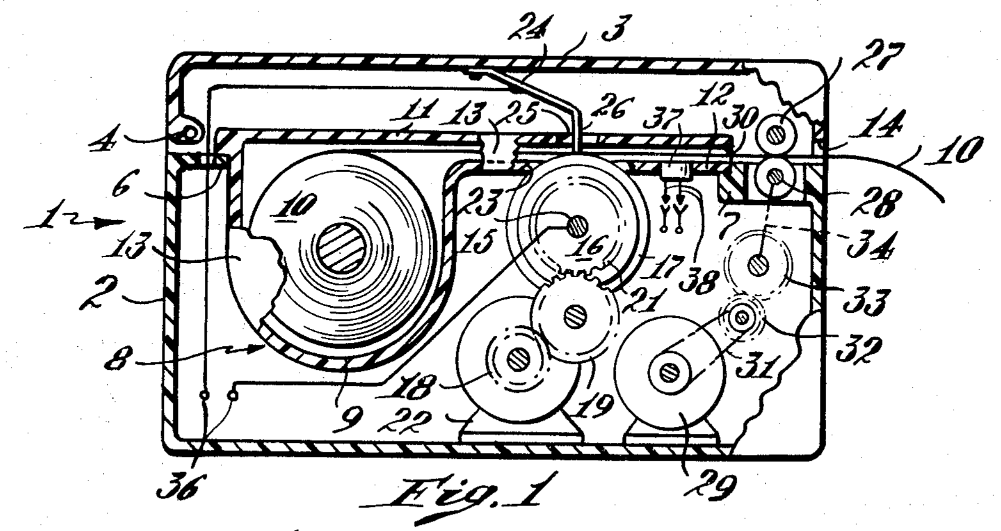
FIG. 1 is a side elevation, partly broken away, of covered electrolytic recording apparatus housing one form of cartridge according to the invention.
Figure 2:
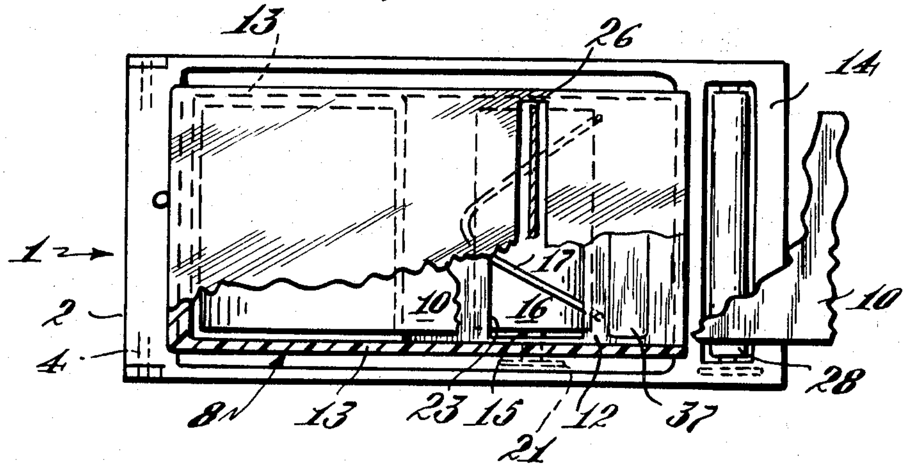
FIG. 2 is a plan view of the apparatus of FIG. 1 with the cover removed.

FIGS. 1 and 2 show an electrolytic facsimile recorder comprising a housing 1 formed by a base 2 and a cover 3 pivoted on the base by a hinge pin 4. At each end of the top of the base 2 are flanges 6 and 7 forming shoulders which receive and position a plastic cartridge 8. The cartridge has a well 9 for receiving a roll of moist electrolytic recording paper 10, the well communicating with a passage formed by an upper wall 11 and a lower wall 12 together with the side walls 13 of the cartridge. The passage constitutes a path for the paper 10 extending toward an exit 14 from the housing between the cover 3 and base 2. In the base is a drum 16 on whose periphery a helical electrode 17 is supported. The drum 17 rotates on an axle 15 journalled to the base 2. The drum 17 is driven through gears 18, 19 and 21 by a motor 22. The helical electrode extends through a rectangular opening 23 in the lower wall 12 of the cartridge into engagement with the underside of the paper 10.

Mounted on the cover 3 is an electrode 24 of stainless sheet steel terminating in a blade 26 which extends through a linear aperture 25 in the upper cartridge wall 11 and flexibly engages the upper side of the paper 10 across the paper in opposition to the helical electrode 17. While shown as a single blade for clarity, the electrode 26 is preferably in the form of a driven loop as disclosed in U.S. Pat. No. 2,621,999. In either case, as the drum 17 and helical electrode are rotated, the intersection of the helix and blade effectively forms a flying spot which scans across a transverse line of the paper between the electrodes.

Beyond the cartridge 8, the paper is engaged between an idler roll 27 journalled on the cover 3 and a roll 28 journalled on the base 2 and driven by a paper feed motor 29 through a chain 31, gears 32 and 33 and a shaft 34. The speeds of the drum motor 22 and paper feed motor 29 are selected such that the paper is advanced one scan line during each transverse sweep of the flying spot. Further the drum motor 22 is synchronized and phased with the incoming facsimile signals. These signals are applied from terminals 36 to the helical electrode 17 through the axle 15 of the drum and to the blade electrode 17, so that during each scan of the paper a correspondingly modulated current passes through the paper and causes a combination of ions from the blade 26 with the moist electrolytic marking compound with which the paper is impregnated resulting in visible marks on the paper. Many such marking compounds are known, a preferred compound being a conductive solution of methylene disalicylic acid disclosed in U.S. Pat. No. 3,409,516.

After the visible record is marked on the moist paper, the paper passes over an electrical heating pad 37 which dries the paper before it is delivered through an exit 30 from the cartridge passage to the exit 14 from the recorder housing to prevent bleeding of the record during travel to the housing exit. As shown, the heating pad is mounted through the lower wall 12 of the cartridge and has electrical connectors 38 mating with contacts on the base 2.

The heating pad 36 may, however, be mounted on the base 2 to extend through an opening in the cartridge.

Figure 3:
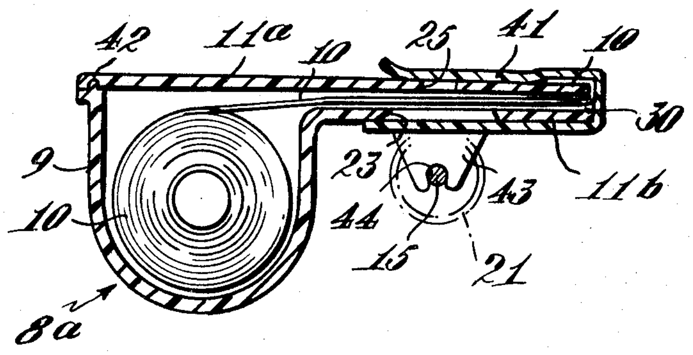
FIGS. 3 and 4 are sections of other forms of cartridge.

In the facsimile recorder of FIGS. 1 and 2, the roll of moist electrolytic recording paper 10 is entirely enclosed within the cartridge except for the blade aperture 11, helix aperture 23 and cartridge exit 30. Prior to use of the cartridge in the housing, these openings are sealed with a peelable tape 41 coated with pressure sensitive adhesive as shown in FIG. 3, so that the paper 10 is completely protected against evaporation and contamination. To place the cartridge in operation, the tape is removed exposing the leading end of the paper 10 beyond the exit 30, the cover 3 opened and the cartridge is dropped into the base 2. The shoulders 6 and 7 on the base register the openings 23 and 25 with the helix 17 and normal position of the blade 26 respectively, and the leading end of the paper 10 overlies the driven roll 28 so that when the cover is closed the paper is engaged between the driver and the idler roll 27, and between the blade and helix. Without further adjustment the paper is ready for recording and substantially entirely protected against evaporation and contamination during use. Upon exhaustion, the paper roll may be almost instantly replaced.

As shown in FIG. 3 the upper wall 11*a* of the cartridge is separably attached to the well 9 by means of a rib 42 integral with the well which snap-fits into a corresponding groove in the upper wall 11*a*. A like rib and groove, not shown, connect the opposite end of the upper wall 11*a* with the lower wall 11*b*. The upper wall 11*a* is thus detachable for replacement of the paper roll. The cartridge of FIG. 3 is also provided with two brackets 43 of which one is shown. The brackets depend from the lower wall 11*b* at each end of the helix aperture 23, and are provided with open sockets 44 into which the axle 15 of the helix drum is snap-fitted. Outside the bracket 43 the axle carries the drive gear 19 which meshes with the gear 21 shown in FIG. 1. The drum assembly is thus replaceably carried on the cartridge in a position which insures that its helical electrode will correctly engage the underside of the paper 10. The cartridge and drum are placed in the housing as a unit.

Figure 4:
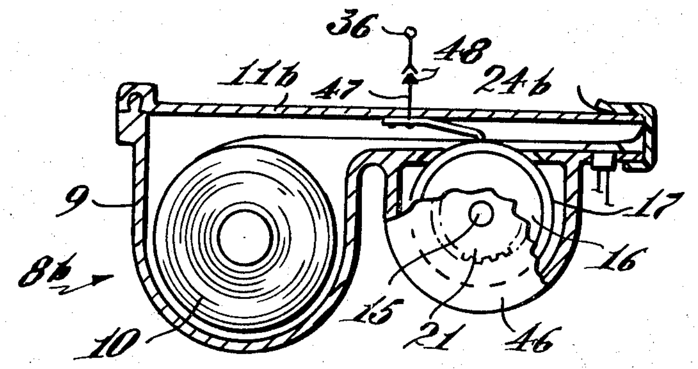

Alternatively as shown in the cartridge 8*b* of FIG. 4 the drum 16 may be permanently mounted in a second well 46 formed integrally with the cartridge. The drum axle 15 extends through the sidewall of the second well to the drive gear 21 which meshes with gear 19 as shown in FIG. 1. Additionally the blade electrode 24*b* is permanently mounted on the upper wall 11*b* of the cartridge with a lead 47 extending outside the cartridge through a plug connection 48 to one facsimile signal terminal 36. In this form of cartridge the blade and helix apertures are omitted, thus reducing evaporation and contamination during operation of the recorder. Also during long operation there is a tendency for the blade 47 to erode and mark the paper unevenly for the blade and helical electrode 17 to collect fragments of the recording paper 10. But with the inexpensive assembly of FIG. 5, the cartridge unit as a whole is discarded when the paper roll is exhausted and before the erosion and clogging occur. The cartridge shown thus provides better protection for the paper and improved recording characteristics.

Figures 5, 6:
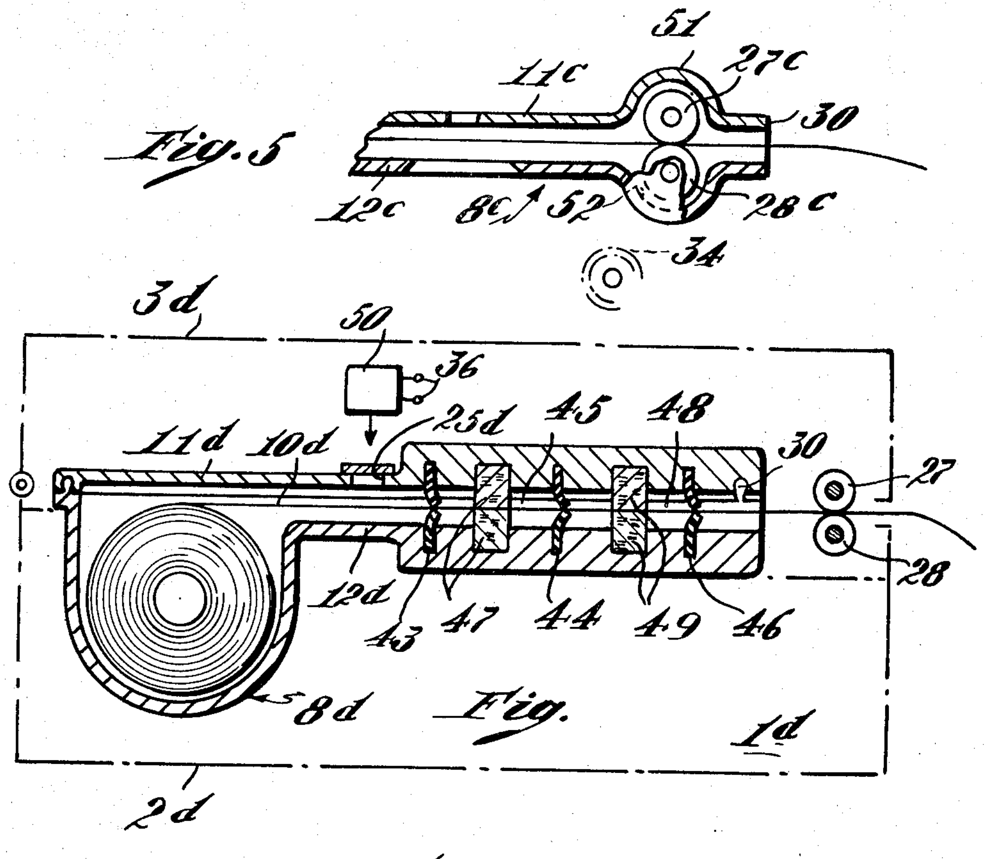
FIG. 5 is a detail showing a modification of the cartridge of FIGS. 1 to 4.
FIG. 6 is a section of a cartridge for use in optical recording apparatus.

Additional protection for the paper may be provided by mounting the paper idler roll 27*c* and driven roll 28*c* integrally with the cartridge 8*c* as shown in FIG. 5. Both rolls are journalled in the sides of small wells 51 and 52 on the walls 27*c* and 28*c* respectively, with the wells fitting around the rolls with a slight clearance, minimizing the passage of moisture or contaminants. The cartridge exit 30 is thus effectively sealed off from the paper roll well 9. The shaft 34 of the driven roll 28*c* carries the gear 33 which meshes with gear 32 as shown in FIG. 1. The integral paper roll mounting may be provided in any of the cartridges of FIGS. 1 to 4.

While the cartridges described above are particularly useful in electrolytic recorders, similar cartridges are useful in optical facsimile recording. In optical recorders a photosensitive recording strip is effectively scanned line by line as it is advanced past a flying light spot modulated with facsimile signals. Such a flying light spot can be formed by means of a moving belt with a small aperture through which the modulated light passes as the aperture passes over the line to be scanned. The flying spot may also be formed at the intersection of a linear slit and a helical slit disposed in the relation of the blade and helix of FIG. 1. Or moving modulated light sources may be projected into one end of a series of fibre optic light conduits whose other ends are disposed linearly along the line to be scanned.

A cartridge for use with such a flying light spot scanner is shown in FIG. 6. The cartridge is made of opaque material and comprises a well 8*d* for holding a roll 10*d* of light-sensitive paper or like web, and upper and lower walls 11*d* and 12*d* forming a straight passage from the well, past a linear scanning aperture 25*d* like aperture 25 of FIG. 1, to an exit 30.

The scanning aperture 25*d* is temporarily light sealed by opaque tape 41*d*, and the passage is sealed by a series of elastomeric squeegees 43, 44 and 46. Between a closed chamber 45 and the first two squeegees 43 and 44 are two blocks 47 of spongy material impregnated with a developer. The blocks extend entirely across the width of the paper 10*d* and grip it sufficiently to spread the developing impregnant on the paper. A like pair of blocks 49 in a closed chamber 48 between squeegees 44 and 46 contain a fixative.

The cartridge is placed in a light-tight housing 1*d* having a cover 3*d* hinged to a base 2*d* similarly as in FIG. 1. The housing contains a flying light spot scanner 50, of the type described above, for utilizing facsimile signals at its terminals 36 to scan through the linear aperture 25*d* line by line on the paper 10*d*. The paper is drawn from the well 8*d* by rolls 27 and 28 as in FIG. 1.

In operation the flying spot exposes the paper 10*d* line by line forming a latent image. This image is developed in the chamber 45, squeegeed by seals 44 then fixed in chamber 48 and further squeegeed by seals 46. The paper issuing from the cartridge exit 30 thus has a developed and fixed image of the fascimile signals supplied to the scanner 50. Prior to and during operation the paper is protected from deterioration, contamination or exposure by the cartridge except for the limited aperture 25*d*.

While certain desirable embodiments of the invention have herein been illustrated and described, it is to be understood that these are mainly by way of example, and the invention is broadly inclusive of any and all modifications falling within the scope of the appended claims.

I claim:

1. For use in recording apparatus having means for feeding an elongate recording web lengthwise and means on a frame for marking the web line by line with a record by scanning transversely thereof; a cartridge comprising a housing forming a chamber for holding a supply of said web, wall means forming an enclosed path for the web from said chamber, a linear aperture through said wall means to said path disposed transversely of the path for allowing line by line scanning therethrough, a web exit beyond said aperture, and means for separably attaching the cartridge to said frame with said marking means operative on the web through said aperture, and with said feeding means engaging the web beyond the aperture to feed the web past the marking means at said aperture and the marked web through said exit out of the cartridge.

2. Apparatus according to claim 1 wherein said feeding means are mounted on said housing.

3. Apparatus according to claim 1 characterized by removable sealing means covering said linear aperture and exit.

4. Apparatus according to claim 1 characterized by means on said housing to mount said marking means.

5. Apparatus according to claim 4 wherein said housing encloses said marking means in a space connected to said aperture.

6. Apparatus according to claim 4 wherein said marking means comprises a linear electrode mounted inside said wall means.

7. Apparatus according to claim 4 wherein said marking means comprises a flying spot scanner.

8. Apparatus according to claim 7 wherein said housing encloses said marking means in a space connected to said aperture.

9. Apparatus according to claim 3 wherein said marking means comprises a rotatable drum with a curved electrode disposed on its periphery.

10. Apparatus according to claim 9 wherein said curved electrode cooperates with a linear electrode mounted in said housing and extending transversely of the web path on the opposite side from said curved electrode.

11. Apparatus according to claim 1 wherein said wall means enclose means beyond said aperture for treating said web.

12. Apparatus according to claim 11 wherein said treating means includes means to render the web record visible prior to exit of the web from the housing.

13. Apparatus according to claim 11 wherein said treating means is a heating element.

14. Apparatus according to claim 13 wherein said chamber holds a supply of moist recording paper and said heating element is located between said linear aperture and web exit.

15. For use in recording apparatus having means for driving an elongate, moist electrolytic recording web lengthwise and means on a frame for marking the web with a record; a cartridge comprising a housing forming a chamber for holding a supply of said moist web, wall means forming an enclosed path for the web from said chamber, a station for marking the moist paper on said path, a web exit beyond said marking station, means for separably attaching the cartridge to said frame with said feeding means engaging the web beyond the marking station to feed the web past the marking means at said aperture and the marked web through said exit out of the cartridge, and a heating element between said marking station and web exit for drying the web beyond said marking station.

16. In recording apparatus having means for feeding an elongate recording web lengthwise and means for marking the web line by line with a record by scanning transversely thereof, said marking means including means to render the record visible, the combination comprising a frame, a housing forming a chamber for holding a supply of said web, wall means forming an enclosed path for the web from said chamber, an aperture through said wall means to said path disposed transversely of the path, and a web exit beyond said aperture, and means separably attaching the housing to said frame with said marking means operative on the web through said aperture, and with said feeding means engaging the web beyond the aperture to feed the web past the marking means at said aperture and the visibly marked web through said exit out of the housing.

17. Facsimile recording apparatus comprising a frame, means for feeding an elongate recording web lengthwise; means for marking the web line by line with a record by scanning transversely thereof, said marking means including means to render the record visible, a housing forming a chamber for holding a supply of said web, wall means forming an enclosed path for the web from said chamber, an aperture through said wall means to said path disposed transversely of the path, and a web exit beyond said aperture; and means separably attaching the housing to said frame with said marking means operative on the web through said aperture, and with said feeding means engaging the web beyond the aperture to feed the web past the marking means at said aperture and the visibly marked web through said exit out of the housing.

References Cited

UNITED STATES PATENTS

| | | | |
|---|---|---|---|
| 2,655,427 | 10/1953 | Alden | 346—74 |
| 2,962,340 | 11/1960 | Alden | 346—101 |

BERNARD KONICK, Primary Examiner

G. M. HOFFMAN, Assistant Examiner

U.S. Cl. X.R.

346—101, 145